Patented Mar. 3, 1925.

1,528,352

UNITED STATES PATENT OFFICE.

SAMUEL F. WALTON, OF BOSTON, MASSACHUSETTS, ASSIGNOR, BY MESNE ASSIGNMENTS, TO INTERNATIONAL COAL PRODUCTS CORPORATION, A CORPORATION OF VIRGINIA.

MANUFACTURE OF SILICON-CARBIDE REFRACTORIES.

No Drawing.     Application filed July 11, 1921.   Serial No. 483,902.

*To all whom it may concern:*

Be it known that I, SAMUEL F. WALTON, a citizen of the United States of America, a resident of Boston, in the county of Suffolk and State of Massachusetts, have invented new and useful Improvements in the Manufacture of Silicon-Carbide Refractories, of which the following is a specification.

This invention relates to the art of making vitrified refractory articles of silicon carbide (commonly designated in the trade as carborundum, carbolon, crystolon, etc.) and has for its object to increase the strength of such articles, especially at high temperatures, to insure the thorough vitrification of the articles throughout, to enable the articles to be thoroughly vitrified in large quantities, and to produce articles which are substantially inert to the action of gases and other substances to which such articles are ordinarily susceptible.

I have discovered that the strength of silicon carbide refractory products is seriously diminished by the surface graphite and other dust in the crushed raw material for two principal reasons. First, because the strength of the product depends in large part on the completeness with which the individual grains are wet with the bonding material, and the dust which coats and surrounds the grains prevents the fused bonding material from coming into intimate contact with the grains and adhering thereto. Second, because the voids are so small when the powdered graphite and dust are present, that they will not hold sufficient bonding material to make a strong product without forcing the grains of silicon carbide apart, which results in spaces filled with the bonding material and dust; a thick body of ceramic bond forms a much less strong union between the particles of silicon carbide than a thin film.

The invention involves the use of crushed silicon carbide in the random-sized grain form in which it comes from the pan mill, except in that the range of grain sizes is altered at least as to the lower limit of grain sizes. This alteration is effected by washing out the finer material including all the silicon carbide flour, graphite and other dust, the finer material being removed preferably up to such size that the voids between the remaining grains is approximately one-fourth the total volume, although for some purposes the voids may constitute twenty-five to thirty-five per cent of the total volume. The washing is preferably done with water, with violent agitation. Acid or alkali washes may be used but with a good grade of furnace material (i. e. crude silicon carbide) the use of such chemical reagents is not necessary.

The upper grain-size limit is preferably regulated by screening the material after or during the crushing operation. The remaining random-sized grains are bonded together with a vitrifying semi-refractory clay, the dry volume of which before vitrification is preferably approximately seven-eighths, or of the order of 80 to 95 per cent, of the aforesaid voids, although for some purposes satisfactory results may be attained anywhere within the range of 75 to 105 per cent. An important characteristic of the clay, at least in one aspect of the invention, is that it has a wide vitrification range, viz., at least of the order of 100° C. That is, the clay should not disintegrate or substantially weaken when heated approximately 100° or more above the incipient softening temperature or the temperature at which vitrification begins.

Whereas refractory articles of the general character to which this invention relates have had an average cross-breaking strength or modulus of rupture below 2,200 pounds per square inch at 100° C., articles made by my new process show a modulus of rupture as high as 5000 pounds per square inch. Another distinguishing characteristic of the product of this method is that the articles are practically impervious to the disintegrating action of destructive gases and the like.

By employing a long vitrification range large articles may be thoroughly vitrified throughout and large numbers of articles may be fired at a time whereas, if the vitrification range were short, the interiors of large articles or the central portion of a large mass of articles would ordinarily not be completely vitrified except at a temperature which would cause the exterior of the articles or mass of articles to begin to boil and disintegrate. Even if the temperature is raised very slowly and applied for a long time it is practically impossible thoroughly to vitrify the entire mass of large articles or of a large number of articles without overheating the outer portions of the article or articles.

In order more clearly to disclose the application of the invention I will now describe a detailed mode of procedure constituting a preferred example of the invention.

Crude silicon carbide as obtained from the electric furnace is crushed in a pan mill over a 16 mesh grid. The product of the pan mill contains granular silicon carbide particles of random sizes, the upper limit of size being determined by the aperture of the grid. In addition to the silicon carbide grains the product contains silicon carbide flour, graphite, and other dust. The pan mill material is next thoroughly washed to remove foreign dust, graphite and such part of the silicon carbide as will readily float off under the conditions of energetic washing, with steam or air agitation, without undue loss of the desirable sizes of grain. The silicon carbide removed ranges from a few per cent of the 100 mesh to 95 to 99 per cent of the almost impalpable powder or flour such as would float in water for many minutes, but if approximately 99.5 per cent of the graphite and flour is removed the resulting material is satisfactory for most purposes.

The washed mass of silicon carbide grains may be dried or the amount of water contained in it may be taken into account in adding water to mix with the bond.

I next mix the silicon carbide grains as above prepared with a certain amount of semi-refractory clay, temporary binder and water. The amount of clay used is of great importance. To determine the correct amount I first determine the percentage of voids or interstitial space in a carefully selected average sample of the silicon carbide to be used. This may vary from 25 to 35 per cent depending upon the crystalline character of the particular furnace run of silicon carbide used, upon its purity, upon the condition and operation of the pan mill and upon the extent to which washing has been carried on. I use an amount of clay equivalent in dry volume to 85% of the free or void space in the sample of silicon carbide grains. With this clay I mix 6% water and 1% temporary organic binder, each by weight, figured on the combined weight of clay and silicon carbide. After thorough mixing, the mass is shaped by hand-tamping into moulds.

A clay having the desired vitrification range and other necessary characteristics may be obtained by mixing the following clays in approximately the percentages indicated: Albany slip clay, 15%; Kentucky ball clay 65%; and Georgia plastic kaolin, 20%.

The articles prepared as above described are next dried so that they can be handled and are then loaded into the kiln in the usual manner and burned. The firing operation is carried on to such a point that every portion of every article reaches the vitrification range of temperatures and remains in this range long enough to insure complete and homogeneous vitrification, which is very important. Owing to the shape of the vitrification curve of the clay used it is possible to use so high a kiln temperature as to insure complete vitrification without danger of overheating and spoiling any part of the material.

The product obtained by the above procedure shows a modulus of rupture as high as 5,000 pounds per square inch at 1000° C. and averages well up to 4,000 pounds. Its thermal conductivity is from 10 to 20 per cent higher than that of the hitherto available commercial articles. It is remarkably impervious to gases.

The grid used to limit the upper size of particles from the pan mill may have a larger or smaller aperture than that corresponding to 16 mesh. It is desirable that the largest particles should be as large as possible so long as none of the large particles consist of crystal aggregates easily broken down. With some types of crude silicon carbide consisting chiefly of large crystals it might be desirable to use a coarser grid. If the particular furnace product used is very finely crystalline it would be desirable to use a somewhat finer grid.

The water washing with violent agitation as specified is the least amount of washing which is desirable. For the purpose of extreme strength of product it may be desirable to carry the washing even farther, although in most cases a residue of a few per cent of the graphite and silicon carbide flour does not produce an observable result in the product.

I have found the use of grain of the random sizes produced by crushing, and particularly by pan mill crushing, to give the maximum strength of product. The use of screened or sized grain, either wholly as a mixture of selected sizes or as an addition to pan mill material, gives no increase in strength, and usually a marked decrease; and the use of such sized grain is very expensive. Where unsalable sizes of grain are available they may be disposed of within reasonable limits by addition to the random size crushed material; but the use of a mixture of standard sized grains alone is unsatisfactory, unless the remixing be, in fact and substantially, a reconstituting of the original random sizes, by the compounding of all, or nearly all, of the sizes derived therefrom by screening, and in, or nearly in, the ratios by weight of the sizes so derived.

The shaping of the mass of silicon carbide, clay, water and binder can be carried out by any of the well-known methods such as hydraulic pressing, hand tamping, machine tamping, etc. I have found that careful hand tamping gives excellent results but any carelessness results in a weakened product, and if dependable labor is not available hydraulic pressing or machine tamping is advisable.

The temporary binder used may be of any nature. I prefer an organic binder such as those known in the art under the names of "Goulac," "Glutren," etc. but other binders such as sodium silicate can be used.

In my preferred form, of the process I carry the vitrification to completion in the kiln. Under certain conditions this is not necessary. Thus, if the product is to be used in a furnace or for other purposes involving a temperature of use higher than it is desirable or economical to attain in the kiln, the kiln temperature need not be carried higher than is necessary to thoroughly set or to partially vitrify the product. In this case the vitrification will be completed soon after the article is put into use. It is essential that this substantially complete vitrification shall take place either in the kiln or under conditions of use before the product has been exposed for any long period to the chemical effects of gases, etc.

I claim:

1. The art of making refractory articles of crushed silicon carbide which comprises removing the surface graphite and other dust therefrom, and bonding the substantially dust-free grains with a vitrifying semi-refractory clay, the dry volume of which before vitrification is not less than 75 per cent of, nor substantially greater than the voids between the carbide grains.

2. The art of making refractory articles of silicon carbide which comprises washing the silicon carbide grains to remove the dust therefrom, and bonding the substantially dust-free grains with a vitrifying semi-refractory clay, the dry volume of which before vitrification is of the order of 80 to 95 per cent of the voids between the carbide grains.

3. The art of making refractory articles which comprises crushing silicon carbide into random-sized grains, regulating the grain-size range while maintaining the random sizes within the range, and bonding the random-sized grains with a vitrifying semi-refractory clay, the dry volume of which before vitrification is approximately seven-eighths of the voids between the carbide grains.

4. The art of making refractory articles of silicon carbide which comprises washing the silicon carbide grains with a liquid capable of removing dust therefrom but incapable of substantially affecting the grains, determining the percentage of voids between the grains and bonding the substantially dust-free grains with a vitrifying clay, the dry volume of which before vitrification is not less than 75 per cent of the voids between the grains, nor substantially greater than said voids.

5. The art of making refractory articles which comprises crushing silicon carbide into random-sized grains, regulating the upper size limit while maintaining the random sizes therebelow, washing the grains with a liquid capable of removing the dust therefrom but incapable of substantially affecting the grains, and bonding the substantially dust-free grains with a vitrifying semi-refractory clay the dry volume of which before vitrification is not less than 75% of the voids between the grains nor substantially greater than said voids.

6. The art of making refractory articles which comprises crushing silicon carbide into random-sized grains, removing the dust from the crushed mass with a fluid incapable of substantially affecting the character of the grains, and bonding the substantially dust-free grains with a vitrifying semi-refractory clay, the dry volume of which is approximately seven-eighths of the voids between the carbide grains.

7. The art of making refractory articles which comprises crushing silicon carbide into random-sized grains, increasing the voids in the mass to the order of 25 to 35 per cent of the total mass by removing the finer material, leaving the coarser grains, up to a predetermined size limit, in approximately the relative proportions of random sizes as produced by the crushing, and uniting the coarser grains with a vitrifying semi-refractory clay, the dry volume of which before vitrification is approximately seven-eighths of the increased voids.

8. The art of making refractory articles which comprises crushing silicon carbide into random-sized grains, increasing the voids in the mass to the order of approximately one-fourth the total mass by washing out the finer material, leaving the coarser grains, up to a predetermined size limit, in approximately the relative proportions of random sizes as produced by the crushing, and uniting the coarser grains with a vitrifying semi-refractory clay, the dry volume of which before vitrification is approximately seven-eighths of the increased voids.

9. The art of making refractory articles which comprises crushing silicon carbide into random sized grains, screening the mass of grains to establish an upper size limit, washing the mass with water to remove the dust and to increase the voids to approximately one-fourth the total mass, maintaining the random sizes of the remaining grains, and uniting the remaining grains with a vitrifying semi-refractory clay, the dry volume of which before vitrification is approximately seven eighths of the increased voids.

Signed by me at Boston, Massachusetts, this 8th day of July, 1921.

SAMUEL F. WALTON.